(12) United States Patent
Callies

(10) Patent No.: US 6,463,711 B1
(45) Date of Patent: Oct. 15, 2002

(54) CONSTRUCTION HANGER

(75) Inventor: Gerald E. Callies, New Prague, MN (US)

(73) Assignee: United Steel Products Company, Inc., Montgomery, MN (US)

( * ) Notice: Subject to any disclaimer, the term of this patent is extended or adjusted under 35 U.S.C. 154(b) by 0 days.

(21) Appl. No.: 09/370,273

(22) Filed: Aug. 9, 1999

(51) Int. Cl.[7] .............................................. E04B 1/38
(52) U.S. Cl. ...................................... 52/702; 403/232.1
(58) Field of Search .................... 52/698, 702, 712; 248/300; 403/232.1

(56) References Cited

U.S. PATENT DOCUMENTS

| 537,505 | A | * | 4/1895 | Van Dorn | .................. 52/702 X |
| 804,451 | A | * | 11/1905 | Carlson | ......................... 52/702 |
| 828,488 | A | * | 8/1906 | Lanz | .......................... 52/702 X |
| 832,133 | A | * | 10/1906 | Lanz | .............................. 52/702 |
| 922,215 | A | * | 5/1909 | Tuteur | .................. 403/232.1 X |
| 3,537,221 | A | * | 11/1970 | Helfman et al. | ........... 52/702 X |
| 4,005,942 | A | | 2/1977 | Gilb | |
| 4,230,416 | A | | 10/1980 | Gilb | |
| 4,234,977 | A | | 11/1980 | Snow | |
| 4,291,996 | A | | 9/1981 | Gilb | |
| 4,411,548 | A | * | 10/1983 | Tschan | ..................... 403/232.1 |
| 4,480,941 | A | | 11/1984 | Gilb et al. | |
| 4,560,301 | A | | 12/1985 | Gilb | |
| 5,564,248 | A | * | 10/1996 | Callies | ......................... 52/702 |
| 5,603,580 | A | * | 2/1997 | Leek et al. | ................ 52/702 X |

* cited by examiner

Primary Examiner—Michael Safavi
(74) Attorney, Agent, or Firm—Dorsey & Whitney LLP

(57) ABSTRACT

A unitary construction hanger constructed from a single piece of material and having a flange portion with a pair of top flanges and a pair of front flanges which are closely adjacent to one another and an integrally connected hanger portion, with the hanger being formed without the use of welding, a blank for forming the hanger of unitary construction and a method of making the hanger of unitary construction.

9 Claims, 5 Drawing Sheets

CONSTRUCTION HANGER

BACKGROUND OF THE INVENTION

1. Field of the Invention

The present invention relates generally to a construction hanger, and more particularly to a construction hanger of the type commonly referred to as a beam or purlin hanger for supporting a beam or joist relative to a header, ledger or other supporting member. The hanger of the present invention is a single piece, unitary hanger which eliminates the welds found in prior art hangers of this type.

2. Description of the Prior Art

A variety of construction hangers currently exist in the art for supporting a joist, rafter, beam or other member relative to a header, ledger or the like. Many of these are single piece hangers which are bent to include a generally U-shaped pocket for receiving the supported member and a pair of side flanges for connection to the front face of the supporting member. Some of these hangers include a top end which extends over the top edge of the supporting member for connection to the top face of such member. Some of these are disclosed in U.S. Pat. Nos. 4,230,416; 4,560,301; 4,291,996; 4,480,941 and 4,423,977.

The construction hangers described above are generally light weight hangers which are comprised of relatively light weight steel. For heavier loads where increased hanger strength is needed or desired, two-piece hangers are provided which comprise a flange portion having top and front flange portions engaging the top and front faces, respectively, of the supporting member and a hanger portion comprised of a generally U-shaped hanger member having a pair of sides and a bottom seat. These flange and hanger portions are connected by welding the upper ends of the hanger portion to the front face of the flange portion. Hangers of this type are commonly referred to as beam or purlin hangers. One such hanger is disclosed in U.S. Pat. No. 4,005,942.

Although these existing beam or purlin hangers generally function satisfactorily and are sufficiently strong, the existence of the welds creates a greater potential for failure. Several reasons exist. First, it is difficult to check the strength or acceptability of the weld without expensive x-ray or other technology. Secondly, if welds are performed manually, there is always the possibility of manual error being introduced. Thirdly, if the welds are performed robotically, any misalignment of the pieces will result in a weld which is not of optimal strength. Misalignment can occur if a piece of dirt or other contaminant gets lodged between the pieces so that one piece is tipped or misaligned with respect to another. Further, the existence of the welds increases the manufacture/assembly time, and thus the cost, of such hangers. For example, hangers which are welded usually are required to be painted, primarily for aesthetic reasons.

Accordingly, there is a need in the art for a beam or purlin hanger which improves upon the welded hangers of the prior art by eliminating the welds, without sacrificing the strength of the hanger.

SUMMARY OF THE INVENTION

In general, the present invention relates to a beam or purlin hanger in which the welds of prior art hangers, and thus the disadvantages related thereto, have been eliminated, without adversely affecting the strength or holding capacity of the hanger. More specifically, the hanger of the present invention is of unitary construction in which the flange and hanger portions are formed from a single piece of material by bending the material rather than by joining the material via a welded joint.

In the preferred embodiment, the hanger of the present invention is a single piece or unitary construction hanger for supporting a supported member relative to a supporting member. The hanger includes a flange portion and a hanger portion. The flange portion is comprised of first and second flange members which are connected to the hanger portion along fold lines. Each of the flange members includes a top flange for engagement with the top face of the supporting member, a front flange for engagement with the front face of the supporting member and outer and inner edges in which the inner edges of the respective first and second hanger members are closely adjacent to one another. The hanger portion includes a pair of side flanges which are connected at their lower ends to a seat member to form a generally U-shaped configuration for receiving an end of the supported member. The upper ends of the side flanges are connected with the front flanges of the first and second flange members, respectively, along a fold line.

A preferred feature of the hanger of the present invention also includes a tab or protruding member extending inwardly or rearwardly from a portion of the seat member or side flanges toward the front face of the supporting member. This tab extends a distance approximately equal to the thickness of the material from which the hanger is constructed and functions to maintain the hanger portion in a position which is square relative to the supporting member and the supported member.

A further feature of the present invention is to provide a blank or piece of sheet material which can be bent along fold lines to form the hanger of the present invention without welds. Such blank or single piece of material includes an elongated central section for forming the seat member and side flanges of the hanger portion and end sections integrally connected near the ends of the central section for forming the first and second flange members of the flange portion.

A still further feature of the present invention includes a method for making the hanger of the present invention which generally includes the steps of cutting a blank from a sheet of material and bending such blank along fold lines to form the hanger of unitary construction having the hanger portion and the flange portion.

Accordingly, it is an object of the present invention to provide a purlin or beam hanger of unitary construction without welds.

A further object of the present invention is to provide a hanger of the type described with means for maintaining the hanger square relative to the supporting member and the supported member.

A further object of the present invention is to provide a single piece hanger blank from which the unitary construction hanger of the present invention can be made.

A still further object of the present invention is to provide a method for making the unitary construction hanger described.

These and other objects of the present invention will become apparent with reference to the drawings, the description of the preferred embodiment and the appended claims.

DESCRIPTION OF THE PREFERRED EMBODIMENT

The present invention relates to a unitary construction hanger for supporting a supported member (commonly referred to as a beam or joist) relative to a supporting member (commonly referred to as a header or ledger). The unitary construction hanger of the present invention is designed to replace prior art hangers commonly referred to as beam or purlin hangers which are provided with continuous top flanges for increased strength and concentrated load conditions. Throughout the specification and claims, unless otherwise stated, the term supporting member, header or ledger will mean the structural member providing a supporting function while the term supported member, beam or joist will mean the structural member which is supported by the supporting member.

Figure 1:
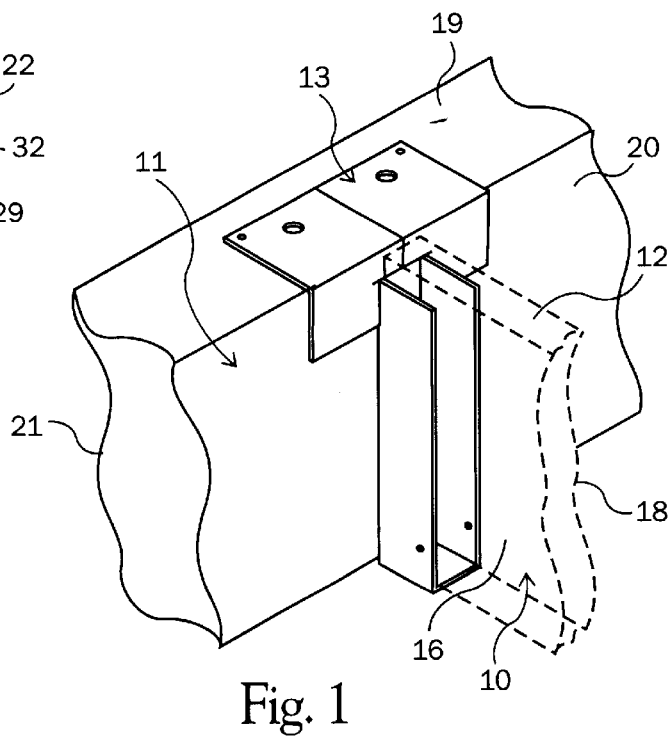
FIG. 1 is an isometric view showing application of the hanger of the present invention to support a supported member relative to a supporting member.
Figure 2:
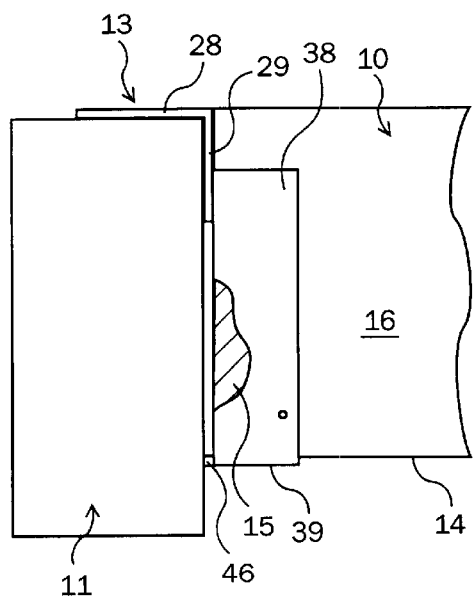
FIG. 2 is a side elevational view showing application of the hanger of the present invention to support a supported member relative to a supporting member.

In describing the unitary construction hanger of the present invention, reference is first made to FIGS. 1 and 2 showing use of such hanger 13 to support a supported member, joist or beam 10 relative to a supporting member, ledger or header 11. As shown, the supported member 10 includes a top edge 12, a parallel bottom edge 14, an end edge 15 and a pair of parallel sides 16 and 18. The supporting member 11 includes a top face 19, a front face 20 and a rear face 21 parallel to the front face 20. These members 10 and 11 normally have rectangular cross-sectional configurations which can have various cross-sectional dimensions. Normally, the width of the supported member (the distance between the sides 16 and 18) will range from about 1-½ to about 7-½ inches while the height of the supported member 10 will range from about 5-½ to about 15 inches. The cross-sectional dimensions of the supporting member 11 will normally be at least as large as those of the supported member and will be sufficiently large to provide the desired supporting function.

Figure 3:
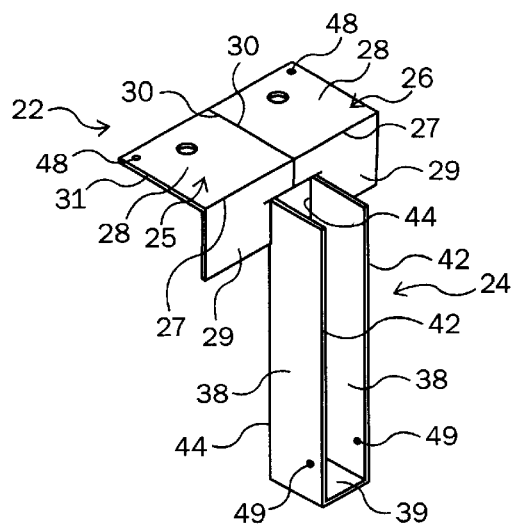
FIG. 3 is an isometric view of the unitary construction hanger of the present invention.

The detailed description of one embodiment of the unitary construction hanger of the present invention is shown best in FIG. 3. Specifically, the hanger includes a flange portion 22 and a hanger portion 24. The flange portion 22 is designed for engagement with the top face 19 and front face 20 of the supporting member 11 and includes a first flange member 25 and a second flange member 26. Each of these flange members 25 and 26 includes a top flange 28 for engagement with the top face 19 the supporting member 11 and a front flange 29 disposed at right angles to the flange 28 for engagement with the front face of the supporting member 11. As shown best in FIG. 1, each of the top flanges 28,28 includes an inner edge 30,30 which are closely adjacent to one another and an outer edge 31,31 which are spaced from one another. The distance between the edges 31,31 defines the length of the flange portion 22. Preferably the length of the flange portion 22 ranges from about 6-½ to about 12 inches, however, other dimensions will function as well, depending primarily upon the desired load bearing capacity.

Preferably the inner edges 30,30 are in substantially abutting relationship with one another. Although benefits of the invention can be realized with a structure in which the inner edges 30,30 are spaced, it is preferred for such spacing to be less than the width of the supported member 10. Further, if desired, although not necessary, the edges 30,30 can be joined by a spot weld or other physical interlock means. The front edges of the top flanges 28,28 are defined by the bend lines 27,27.

Figure 4:
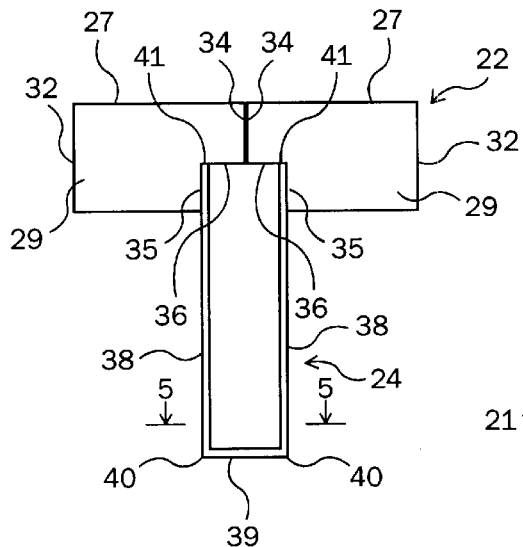
FIG. 4 is a front elevational view of the unitary construction hanger of FIG. 1.

As shown best in FIGS. 3 and 4, the front flanges 29,29 are connected with the flanges 28,28 at right angles and include opposite outer edges 32,32 which are continuations of the outer edges 31,31 of the top flanges 28,28. The front flanges 29,29 also include first upper inner edge portions 34,34 which, when the hanger is fully assembled, are positioned in close, adjacent relationship to one another. Similar to the inner edges 30,30, the upper inner edge portions 34,34 are preferably in substantially abutting relationship with one another, although benefits of the invention can be realized if the edge portions are spaced a distance less than the width of the supported member 10.

Second lower inner edge portions of the front flanges 29,29 are integrally joined with respective side flanges 38,38 of the hanger portion 24 along fold lines 35,35 and are accordingly defined by the fold lines 35,35 as described in greater detail below. A bottom edge portion 36,36 of the flanges 29,29 extends from the top end of the bend line 35,35 to the bottom ends of their respective inner edge portions 34,34. The top edges of the front flanges 29,29 are defined by the bend line 27,27 between the flanges 29,29 and the top flanges 28,28. With the above structure as shown in FIGS. 3 and 4, the area between the bend lines 35,35 is free of any material.

With continuing reference to FIGS. 3 and 4, the hanger portion 24 includes a pair of side flanges 38,38 and a bottom seat member 39. The side flanges 38,38 are connected at their bottom edges to the side edges of the seat member 39 along the bend lines 40,40. The top edges 41,41 of the side flanges 38,38 extend outwardly from the front flanges 29,29 at a point spaced downwardly from the top flange edges defined by the bend lines 27,27. The side flanges 38,38 also include front edges 42,42 and rear edges 44,44 extending the length of the side flanges 38,38. As shown best in FIGS. 3 and 4, the upper ends of the rear edges 44,44 are integrally joined with a respective one of the front flanges 29,29 along the bend lines 35,35.

The seat member 39 has a generally rectangular configuration and is integrally joined with the side flanges 38,38 at its side edges along the bend lines 40,40. In the embodiment of FIGS. 3 and 4, the side flanges 38,38 join with the seat member 39 at substantially right angles. Further, the side flanges 38,38 extend outwardly from the front flanges 29,29 at substantially right angles and the side flanges 38,38 are substantially of equal length. As shown in the embodiments of FIGS. 9–13, however, these relationships depend on the particular hanger being constructed.

Figure 5A:
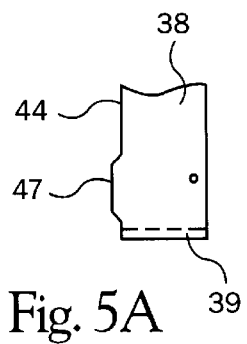
FIG. 5A is a side elevational fragmentary view of a portion of a hanger portion flange.
Figure 5:
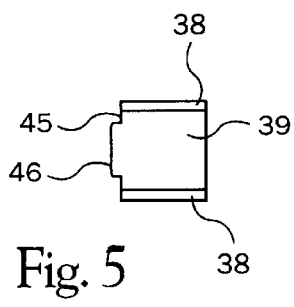
FIG. 5 is a view, partially in section, as viewed along the section lines 5—5 of FIG. 4.

As illustrated best in FIG. 5, the rearward edge 45 of the seat member 39 includes a rearwardly extending tab or spacing member 46. This member 46 extends rearwardly from the rearward edge 45, and thus the rearward edges 44,44 of the flanges 38,38, a distance equal to the thickness of the material from which the hanger is constructed. As shown in FIG. 2, the existence of the tab 46 maintains the seat member 39 and the lower ends of the edges 44 spaced from the front face 20 of the supporting member 11 to maintain the entire hanger structure "square" relative to the supporting member 11 and the supporting member 10. Specifically, the tab 46 insures a parallel relationship between the edges 44,44 and the front face 20 of the supporting member 11 and between the seat member 39 and the bottom edge 14 of the supported member 10. If desired, the tab portion can also be provided along all or a portion of the rear edges 44,44 of side flanges 38,38 as shown in FIG. 5A in the form of the tab portion 47. In fact, the entire length of the inner edges 44,44 and/or the inner edge 45 of the seat member 39 could be provided with an increase in dimension corresponding to the thickness of the hanger material used to maintain the hanger in a "square" position.

A plurality of nailing holes 48 and 49 can be provided in the flange portion 22 and the hanger portion 24, respectively, to retain such flange and hanger portions in a fixed position relative to their respective supporting and supported members 11 and 10.

The hanger of the present invention is intended to be constructed from a blank or single piece cut from sheet metal or the like. Such metal may be galvanized or not as desired and may comprise a variety of thicknesses. Preferably, although not required, the hanger of the present invention is constructed of sheet metal with thicknesses ranging from about 10 gauge or thinner to about 7 gauge or thicker.

Having described the unitary construction hanger of the present invention in detail, the hanger blank or single piece of material from which the hanger of FIG. 3 is formed can be described with reference to FIG. 6. As shown, the hanger blank includes an elongated central section 50 and a pair of end sections 51,51. The central section 50 is comprised of the side flanges 38,38 and the seat member 39 and includes a pair of ends corresponding to the top edges 41,41 of the side flanges 38,38. The length of the central section 50 is equal to the sum of the lengths of the side flanges 38,38 and the width of the seat member 39. The width of the elongated central section 50 is equal to the width of the side flanges 38,38 between the front and rear edges 42,42 and 44,44, respectively. Centrally located between the ends 41,41 are a pair of bend lines 40,40 defining the junction between the side flanges 38,38 and the seat member 39. As shown, the bend lines 40,40 are generally parallel to one another and extend from the edges 42,42 to the edges 44,44.

An outer end portion of each of the flange edges 44,44 is joined to the end sections 51,51 along the bend lines 35,35. The end sections 51,51 comprise the front flanges 29,29 and the top flanges 28,28 of the first and second flange members 25 and 26. The flanges 28,28 and 29,29 are separated by bend lines 27,27 which ultimately form the front and top edges joining the top flanges 28,28 and their respective front flanges 29,29.

As shown, the edge portions 34,34 and 30,30 of the end sections 51,51 extend outwardly from the end edges 41,41 at a point intermediate between the edges 42,42 and 44,44. This enables the edge portions 34,34 and 30,30 to be in close substantially abutting adjacent relationship when the hanger is assembled or to enable the spacing between such edges to be less than the width of the supported member 10.

Figure 6:
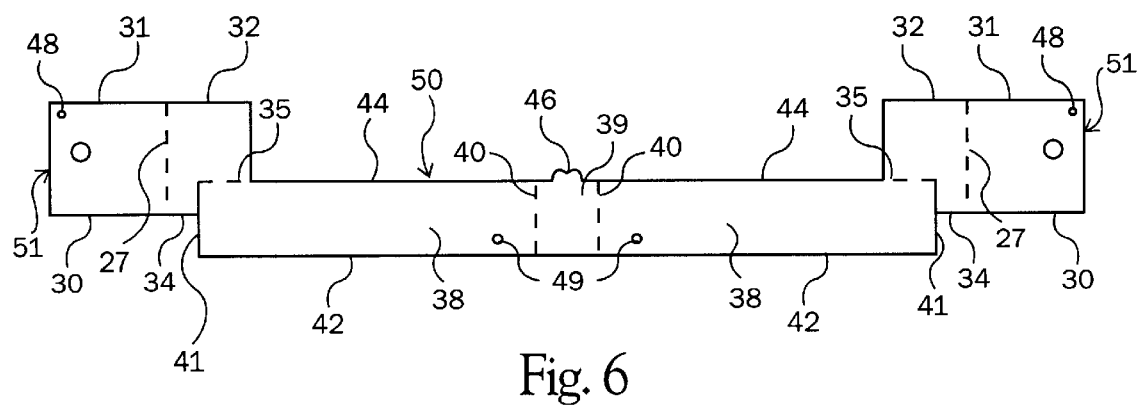
FIG. 6 is a plan view of a hanger blank from which the unitary construction hanger of FIG. 3 is made.

To assemble the unitary construction hanger of the present invention, the blank of FIG. 6 is folded or bent along the bend lines 40,40, 35,35 and 27,27. The order of the bends is not critical; however, the direction of the bends is. Specifically, as shown in FIG. 6, to assemble the hanger of the embodiment of the present invention shown in FIG. 3, the hanger portions adjacent to the bend lines 40,40 and 27,27 are bent inwardly 90° relative to the drawing of FIG. 6, while the hanger portions adjacent to the bend lines 35,35 are bent outwardly relative to the drawing of FIG. 6. For example, the top flanges 28,28 would be bent inwardly relative to the flanges 29,29 about the bend 27,27. Similarly, the side flanges 38,38 would be bent inwardly relative to the seat member 39 about the bend lines 40,40. Finally, the front flanges 29,29 would be folded outwardly relative to the outer ends of the side flanges 38,38 about the bend lines 35,35.

Figure 7:
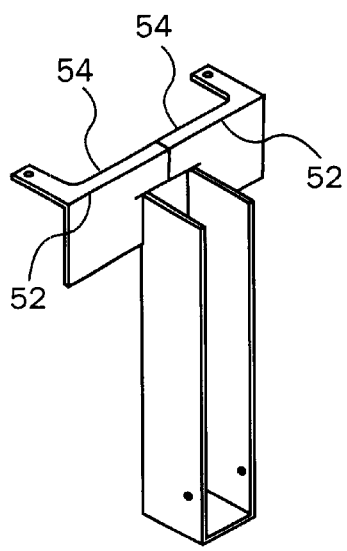
FIG. 7 is an isometric view of a further embodiment of the unitary construction hanger of the present invention.
Figure 8:
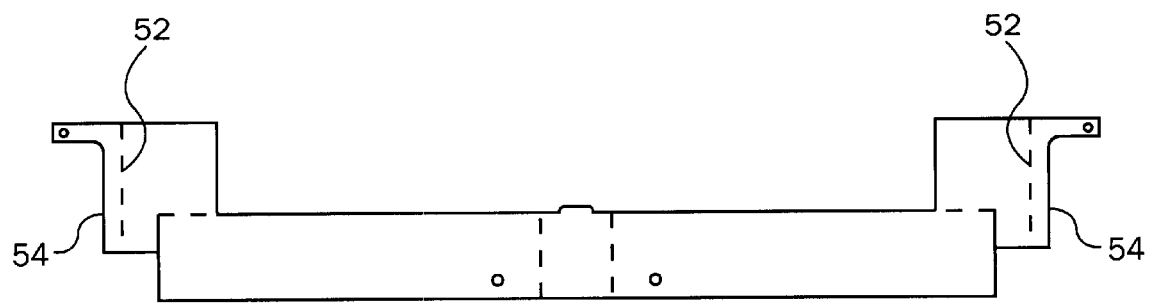
FIG. 8 is a plan view of a hanger blank used to form the hanger of FIG. 7.

The second hanger embodiment shown in FIGS. 7 and 8 is substantially the same as the embodiment of FIGS. 3 and 6 except that it exhibits modified top flanges. Specifically, in the embodiment of FIGS. 7 and 8, the top flanges 52,52 include a narrowed or recessed portion 54,54.

In addition to the relatively standard and most common hanger embodiments shown in FIGS. 3 and 7, the unitary construction of the present invention can be used to make a variety of alternate hanger structures as well. Examples include skewed hangers, sloped hangers, angled hangers, double angled hangers, and saddle hangers, among possible others. FIGS. 9–12 show many of other possible hanger configurations utilizing the unitary construction of the present invention.

Figure 9:
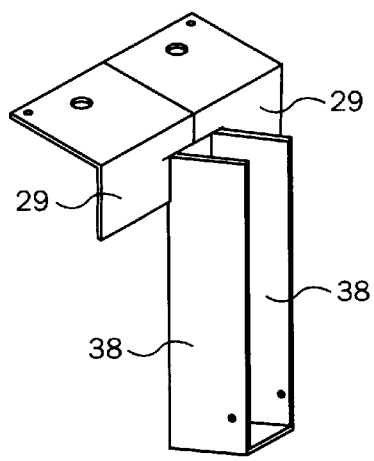
FIG. 9 is an isometric view of a skewed hanger utilizing the unitary construction of the present invention.
Figure 9A:
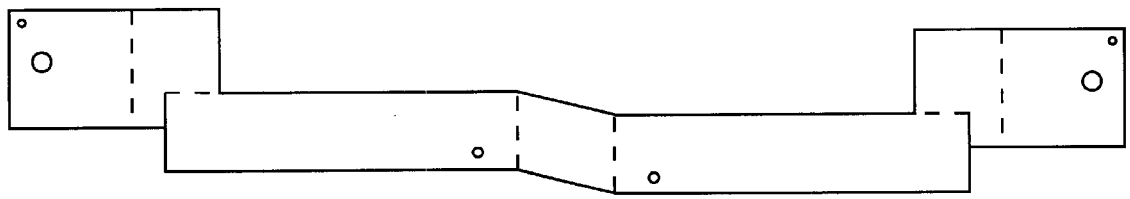
FIG. 9A is a plan view of a hanger blank from which the unitary construction hanger of FIG. 9 is made.

Specifically, FIG. 9 illustrates a skewed hanger, and in particular a left skewed hanger in which the orientation of the side flanges are disposed at an angle other than 90° relative to their respective front flanges 29,29. This particular hanger configuration is designed for supporting a supported member at a horizontal angle relative to the supporting member. In FIG. 9A showing the hanger blank for the hanger of FIG. 9, the bend lines 40,40 extend between the edges 42,42 and 44,44 at an angle other than 90°.

Figure 10:
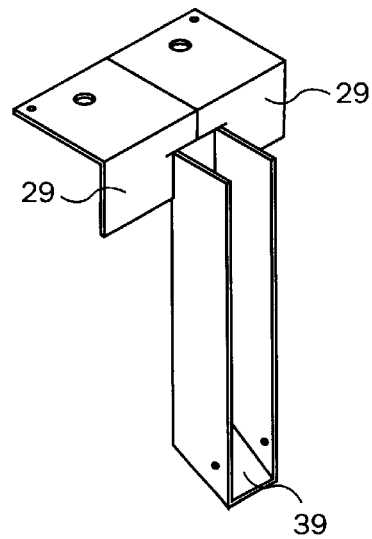
FIG. 10 is an isometric view of a sloped hanger utilizing the unitary construction of the present invention.
Figure 10A:
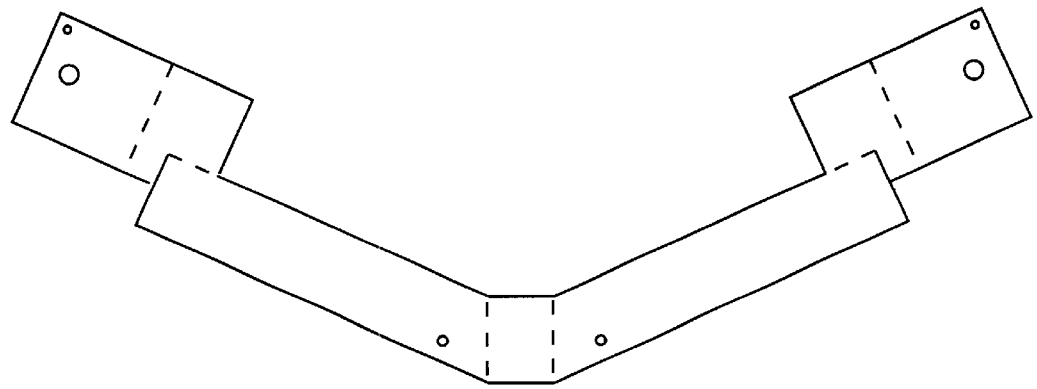
FIG. 10A is a plan view of a hanger blank from which the unitary construction hanger of FIG. 10 is made.

FIG. 10 is a sloped hanger configuration in which the seat member 39 is sloped relative to the front flanges 29,29 at an angle other than 90°. This hanger is designed to mount a supported member at a vertical angle relative to the supporting member. As shown in FIG. 10A, the side flanges 38,38 extend from the fold lines 40,40 at an angle as shown.

Figure 11:
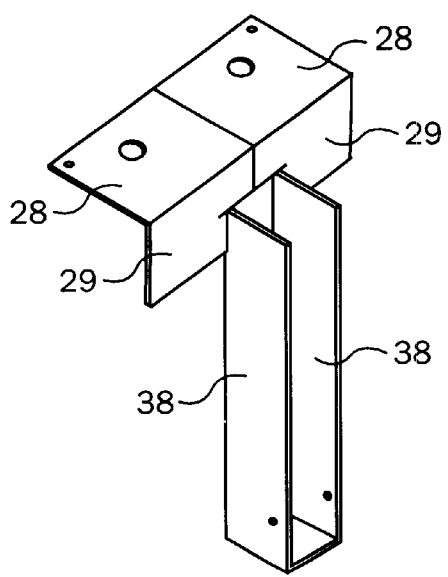
FIG. 11 is an isometric view of an angled hanger utilizing the unitary construction of the present invention.

The hanger construction shown in FIG. 11 is an angled hanger and more particularly a left angled hanger in which the supporting member is positioned at an angle other than 90° relative to the supported member. In this embodiment, one of the side flanges 38,38 is longer than the other and the fold lines 35,35 between the flanges 29,29 and the upper ends of the side flanges 38,38 are disposed at an angle to accommodate the angled flange portion.

Figure 12:
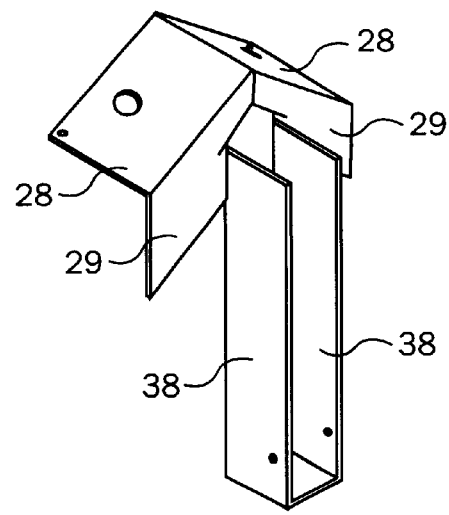
FIG. 12 is an isometric view of a double angled hanger utilizing the unitary construction of the present invention.

FIG. 12 shows a double angled hanger for supporting a supported member to a pair of supporting members which are themselves joined at an angle.

Although the description of the preferred embodiment has been quite specific, it is contemplated that various modifications and changes could be made without deviating from the spirit of the present invention. Accordingly, it is contemplated that the scope of the present invention be dictated by the appended claims rather than by the description of the preferred embodiment.

What is claimed is:

1. A unitary construction hanger constructed from a single piece of sheet metal for supporting a supported member relative to a supporting member in which the supported member includes a supported member top face, a supported member bottom face and a pair of supported member side faces and the supporting member includes a supporting member top face, a supporting member front face, and a supporting member rear face, the construction hanger comprising:

a flange portion comprised of first and second flange members, each of said first and second flange members including;

a top flange for engagement with the supporting member top face, each of said top flanges including a front edge and an inner edge, said inner edges being adjacent to one another, a front flange for engagement with the supporting member front face, each of said front flanges having a top edge integrally joined with said front edge of a corresponding top flange along a bend line, a first inner edge portion adjacent to one another and a second inner edge portion, and a hanger portion including a pair of side flanges having top, bottom and rearward edges and a seat member having a pair of side edges, the bottom edge of each side flange being integrally joined with a respective side edge of said seat member along a bend line and a portion of the rear edge of each side flange near its top edge being integrally joined with a respective front flange along said second inner edge portion along a bend line, said first inner edge portions of said front flanges being spaced from each other a distance less than the distance between said side flanges and said second inner edge portions of said front flanges being spaced from each other a distance no less than the distance between said side flanges.

2. The construction hanger of claim 1 which is free of any welds.

3. The construction hanger of claim 1 wherein said first inner edge portions of said front flanges are adjacent to one another.

4. A single piece blank for a unitary construction hanger of the type having a flange portion and an integral hanger portion wherein said flange portion comprises first and second flange members each having a top flange and a front flange and wherein said hanger portion comprises a pair of side flanges integrally formed with a seat member and said hanger portion is integrally joined with said flange portion along a bend line, said hanger comprising:

a central, elongated section having front and rearward edges corresponding to front and rearward edges of said hanger portion and a pair of end edges corresponding to the top edges of said hanger portion and further having a pair of substantially parallel bend lines intermediate between said end edges and extending from said front edge toward said rearward edge;

a first end section forming one of said first and second flange members, said first end section being integrally joined to said rearward edge adjacent to one of said end edges along a bend line and having top and front flanges of one of said first and second flange members joined to one another along a bend line positioned outwardly from said one end edge; and a second end section forming the other of said first and second flange members, said second end section being integrally joined to said rearward edge adjacent to the other of said end edges along a bend line and having top and front flanges of the other of said first and second flange members joined to one another along a bend line positioned outwardly from said other end edge wherein each of said first and second end sections includes a pair of substantially parallel flange edges wherein one of said pair of flange edges extends outwardly from one of said end edges at a point between said front and rearward edges.

5. A unitary construction hanger constructed from a single piece of material for supporting a supported member relative to a supporting member in which the supported member includes a supported member top face, a supported member bottom face and a pair of supported member side faces and the supporting member includes a supporting member top face, a supporting member front face and a supporting member rear face, the construction hanger comprising:

a flange portion comprised of first and second flange members, said first flange member having a first top flange for engagement with the supporting member top face and a first front flange for engagement with the supporting member front face, said first top flange including a first inner edge and a first front edge and said first front flange including a first top edge integrally joined with said first front edge and a first upper inner edge portion and a first lower inner edge portion, said second flange member having a second top flange for engagement with the supporting member top face and a second front flange for engagement with the supporting member front face, said second top flange including a second inner edge and a second front edge and said second front flange including a second top edge integrally joined with said second front edge and a second upper inner edge portion and a second lower inner edge portion;

a hanger portion comprised of a seat member for engagement with the supported member bottom face and a pair of parallel side flanges for engagement with the supported member side faces, said seat member including first and second side edges and a rearward edge, said side flanges each including a top edge, a bottom edge and a rearward edge, said bottom edge of said side flanges integrally joined to a respective side edge of said seat member along a bend line and each of said side flanges being integrally joined with a respective one of said first and second front flanges along a bend line defined by a portion of the rearward edge of said side flange adjacent to the top edge of said side flange and the lower inner edge portion of said respective one of said first and second front flanges, said upper inner edge portions of said respective one of said first and second front flanges being free of connection to said pair of side flanges wherein the width of said hanger portion is defined by the distance between said side flanges and wherein any spacing between said inner edges of said first and second top flanges is less than the width of said hanger portion.

6. A unitary construction hanger constructed from a single piece of material for supporting a supported member relative to a supporting member in which the supported member includes a supported member top face, a supported member bottom face and a pair of supported member side faces and the supporting member includes a supporting member top face, a supporting member front face and a supporting member rear face, the construction hanger comprising:

a flange portion comprised of first and second flange members, said first flange member having a first top flange for engagement with the supporting member top face and a first front flange for engagement with the supporting member front face, said first top flange including a first inner edge and a first front edge and said first front flange including a first top edge integrally joined with said first front edge and a first upper inner edge portion and a first lower inner edge portion, said second flange member having a second top flange for engagement with the supporting member top face and a second front flange for engagement with the supporting member front face, said second top flange including a second inner edge and a second front edge and said second front flange including a second top edge integrally joined with said second front edge and a second upper inner edge portion and a second lower inner edge portion, a hanger portion comprised of a seat member for engagement with the supported member bottom face and a pair of parallel side flanges for engagement with the supported member side faces, said seat member including first and second side edges and a rearward edge, said side flanges each including a top edge, a bottom edge and a rearward edge, said bottom edge of said side flanges integrally joined to a respective side edge of said seat member along a bend line and each of said side flanges being integrally joined with a respective one of said first and second front flanges along a bend line defined by a portion of the rearward edge of said side flange adjacent to the top edge of said side flange and the lower inner edge portion of said respective one of said first and second front flanges, said upper inner edge portions of said respective one of said first and second front flanges being free of connection to said pair of side flanges wherein the width of said hanger portion is defined by the distance between said side flanges and wherein any spacing between said upper inner edge portions of said first and second front flanges is less than the width of said hanger portion.

7. A unitary construction hanger constructed from a single piece of material for supporting a supported member relative to a supporting member in which the supported member includes a supported member top face, a supported member bottom face and a pair of supported member side faces and the supporting member includes a supporting member top face, a supporting member front face and a supporting member rear face, the construction hanger comprising:

a flange portion comprised of first and second flange members, said first flange member having a first top flange for engagement with the supporting member top face and a first front flange for engagement with the supporting member front face, said first top flange including a first inner edge and a first front edge and said first front flange including a first top edge integrally joined with said first front edge and a first upper inner edge portion and a first lower inner edge portion, said second flange member having a second top flange for engagement with the supporting member top face and a second front flange for engagement with the supporting member front face, said second top flange including a second inner edge and a second front edge and said second front flange including a second top edge integrally joined with said second front edge and a second upper inner edge portion and a second lower inner edge portion;

a hanger portion comprised of a seat member for engagement with the supported member bottom face and a pair of parallel side flanges for engagement with the supported member side faces, said seat member including first and second side edges and a rearward edge, said side flanges each including a top edge, a bottom edge and a rearward edge, said bottom edge of said side flanges integrally joined to a respective side edge of said seat member along a bend line and each of said side flanges being integrally joined with a respective one of said first and second front flanges along a bend line defined by a portion of the rearward edge of said side flange adjacent to the top edge of said side flange and the lower inner edge portion of said respective one of said first and second front flanges, said upper inner edge portions of said respective one of said first and second front flanges being free of connection to said pair of side flanges wherein said first front flange includes a lower inner edge portion laterally spaced from said upper inner edge portion of said first front flange and said second front flange includes a lower inner edge portion laterally spaced from said upper inner edge portion of said second front flange.

8. The construction hanger of claim 7 wherein the rearward edges of said side flanges are integrally connected with a respective one of said first and second front flanges along said lower inner edge portions of said first and second front flanges, respectively.

9. The construction hanger of claim 8 which is free of welds.

* * * * *